United States Patent Office 3,403,678
Patented Oct. 1, 1968

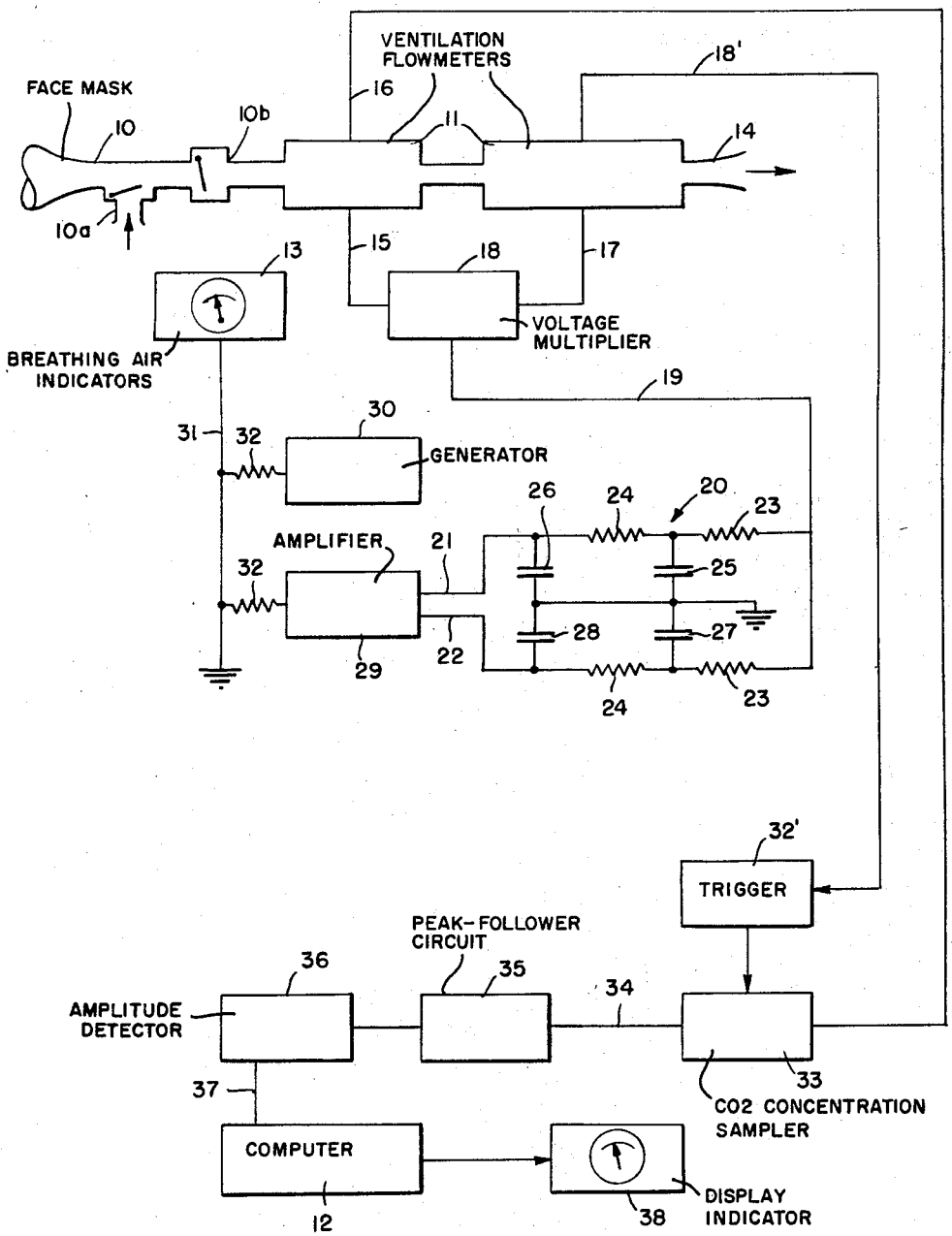

3,403,678
WHOLE BODY PERFUSION TIME
MONITOR AND METHOD
Victor W. Bolie, Tustin, Calif., assignor to Iowa State
University Research Foundation, Inc., Ames, Iowa, a
corporation of Iowa
Filed Nov. 4, 1964, Ser. No. 408,952
4 Claims. (Cl. 128—2.07)

ABSTRACT OF THE DISCLOSURE

An apparatus and method for obtaining the internal perfusion time constant for blood circulation. The subject's expired gas is collected and the $CO_2$ concentration and flow rate is measured. Indicator means observable by the subject is connected to the $CO_2$ measuring means so that the subject can vary his $CO_2$ elimination rate in a cyclic fashion. The $CO_2$ measuring means is also connected to a computer which conveys information to a visual time constant display indicator.

---

This invention relates to a whole body perfusion time monitor. More particularly, the invention involves the use of an equation coupling cyclic ventilation and whole body perfusion. Determination of the whole body perfusion time constant is a good substitute for the much more difficultly obtainable cardiac output.

An object of the invention is to provide apparatus and method for assessing the internal perfusion time-constant for blood circulation through the whole body from entirely external respiratory gas measurements. Inasmuch as the invention utilizes the coupling between body compartments to develop information on one difficultly reached compartment through use of data on the other and more easily reached compartment, a more generalized object is to provide a means and method embodying this novel approach.

Another object of the invention is to derive and utilize an equation from which the time constant for whole-body perfusion can be assessed without surgical intervention, and which is applicable to the newer types of in-flight ventilatory measurements in aerospace medicine.

In view of the availability of accurate and rapidly responding instruments for monitoring respiratory gas flow rate and composition it is now possible to use an on-the-line, real-time computer to present to the experimental subject a calibrated meter-display of his $CO_2$ blowoff rate. Conscious ventilatory effort by the subject can thus be employed to program an imbalance between $CO_2$ metabolic production rate and expired $CO_2$ loss rate, and the utilization of this to provide measurements which are directly linked to the $CO_2$ gas stores and thus to the rate which the circulatory system perfuses the whole body constitutes still another object of the invention.

The present invention incorporates these concepts into a mathematical framework which is shown to agree with experimental facts observable in typical hyperventilation experiments. Further analysis of the case in which the programmed $CO_2$ blowoff rate is varied sinusoidally with time about the mean $CO_2$ production rate in the tissues results in a formula for assessing the internal perfusion time-constant for blood circulation through the whole body from entirely external respiratory gas measurements, and a further object of the invention is to provide an apparatus and a method utilizing this formula.

Other objects and advantages of the invention may be seen in the details of the following specification.

The invention is explained in conjunction with the accompanying drawing which schematically represents apparatus for practicing the invention.

Transient changes in cardiac output and in respiratory gas composition rank among the most rapidly responding indicators of imbalances between the functions of the heart-lung-tissue system. Improvements in theory, instrumentation, and technique in recent years suggest several possibilities for extracting new information on the interrelationships between the heart and lung functions. One significant index of adequate circulation is a sufficiently short time constant for whole body perfusion, i.e., the ratio of the effective whole-body volume (liters) divided by the cardiac output (liters/minute). This time constant can be expected to range from about 2 to about 20 minutes, depending on the state of exercise, and its value can be extracted from carefully planned and properly instrumented cyclic ventilation measurements.

Among the still valid respiratory measurements are the 1951 studies by Rahn et al.,[1] on alveolar $CO_2$ during hyperventilation. Other measurements by Fahri and Rahn[2] in 1955 elucidated the differential $O_2$ and $CO_2$ storage capabilities of myoglobin, arterial and venous blood and fat-free tissues as functions of the partial pressures of the gases. A mathematical analysis of cyclic changes in alveolar $CO_2$ by Chilton and Stacy[3] in 1952 considered in some detail the storage effect in the pulmonary capillary beds. A related theoretical analysis of alveolar $O_2$ changes during the breathing cycle was presented in 1954 by Chilton et al.[4] A consolidation of these concepts, plus a rigorous mathematical development of the new concept of programming nonstationary breathing patterns to extract new cardiopulmonary measurements, was recently published by Bolie ([5]). These teachings make possible the determination of other variables which may be computerized along with the inventive equation to yield direct reading results of perfusion time constants.

The development of the specific equation for the multi-compartment utilization to present an approximation of cardiac output based on sinusoidal variation of exhaled $CO_2$ is set forth below.

The following quantities can be defined for a three-compartment (lung, blood, tissue) model of the respira-

---

[1] Rahn, H.; Mohney, J.; Otis, A. B.; and Fenn, W. O., "A Method for the Continuous Analysis of Alveolar Air," AF Technical Report 6528, Wright Air Development Center, August 1951, pp. 276–282.
[2] Fahri, L. E., and Rahn, H., "The Gas Stores in the Steady State," WADC Technical Report 55–357 (Studies in Respiratory Physiology. Second Series: Chemistry, Mechanics, and Circulation of the Lung. Edited by Hermann Rahn and Wallace O. Fenn). Wright Air Development Center, November 1955, pp. 268–289.
[3] Chilton, Arthur B., and Stacy, Ralph W., "A Mathematical Analysis of Carbon Dioxide in Man." Bulletin of Mathematical Biophysics. 14(1) : 1–18, March 1952.
[4] Chilton, Arthur B.; Barth, Delbert S.: and Stacy, Ralph W., "A Mathematical Analysis of Oxygen Respiration in Man." Bulletin of Mathematical Biophysics. 16(1) : 1–14, March 1954.
[5] Bolie, Victor W., "Equation of Coupling Between Cyclic Ventilation and Whole Body Perfusion," Proceedings of the 1964 San Diego Biomedical Engineering Symposium, pp. 309–315, June 1964.

tory system, assuming the variables are mean values averaged over several respiratory cycles.

| Symbol | Definition | Units |
|---|---|---|
| $V_L$ | Effective lung volume | Liters. |
| $V_B$ | Effective body tissue volume | Do. |
| $R$ | Cardiac output | Liters/minute. |
| $M$ | Tissue $CO_2$ production rate | Moles/minute. |
| $\dot{Q}$ | Expired $CO_2$ loss rate | Do. |
| $c_V$ | Mixed venous $CO_2$ concentration | Moles/liter. |
| $c_A$ | Arterial $CO_2$ concentration | Do. |
| $c_L$ | Alveolar $CO_2$ concentration | Do. |
| $c_B$ | Body tissue $CO_2$ concentration | Do. |
| $t$ | Time | Minutes. |

It should be noted that $V_L$ and $V_B$ are not anatomical volumes but functional volumes which are effective in the ready exchange of $CO_2$ into and out of the pulmonary and peripheral capillary beds.

The interactions between these quantities can be approximated by the following set of differential equations.

$$V_L \frac{dc_L}{dt} = R(c_V - c_A) - \dot{Q} \quad (1)$$

$$V_B \frac{dc_B}{dt} = M - R(d_V - c_A) \quad (2)$$

$$c_A = a + bc_L \quad (3)$$

$$c_V = c_B \quad (4)$$

Equation 1 relates the sources and sinks for alveolar $CO_2$ to its time rate of change. The second Equation 2 does the same for tissue $CO_2$. The third Equation 3 assumes good equilibration of alveolar and arterial $CO_2$ partial pressures, and utilizes a slope-intercept approximation for the $CO_2$ absorption curve for blood. Equation 4 assumes the issue $CO_2$ concentration is the same as the $CO_2$ concentration in the venous blood leaving the tissues, and also assumes that the tissue-to-lung transit time is short compared to the time required for the tissue $CO_2$ concentration to change appreciably. These equations are correct as first approximations, and can be elaborated if greater accuracy of representation is desired.

Substitution of the Equations 3 and 4 into the first two, followed by elimination of $c_B$ gives, for a relatively steady cardiac output, $$\frac{V_L}{R}\frac{d^2 c_L}{dt^2} + \left(b + \frac{V_L}{V_B}\right)\frac{dc_L}{dt} = \frac{M - \dot{Q}}{V_B} - \frac{\ddot{Q}}{R} \quad (5)$$

where $\ddot{Q}$ represents the time rate of change of $\dot{Q}$. This differential equation suggests numerous respiratory experiments in which certain combinations of programmed stimuli and response measurements can yield new information. For example, if a subject (fitted with a $CO_2$ sampling face mask 10 and ventilation flowmeter 11 so that a small computer circuit 12 can present $\dot{Q}$ on one of his display indicators 13) suddenly begins hyperventilating in such a way that the *difference* between his new $CO_2$ loss rate and his previous $CO_2$ loss rate remains at the constant excess-value $\Delta \dot{Q}$, his end-tidal $CO_2$ concentration will fall with time thereafter in accord with the equation.

$$c_L = c_L^\circ - \frac{\Delta \dot{Q}}{V_L}\left[\frac{B-A}{B^2}(1-e^{-Bt}) + \frac{A}{B}t\right] \quad (6)$$

where $c_L^\circ$ is his previously steady alveolar $CO_2$ concentration and where A and B are "inverse time constants" given by the formulas $$A = \frac{R}{V_B} \quad (7)$$

and $$B = \left[b + \frac{V_L}{V_B}\right]\frac{R}{V_L} \quad (8)$$

This means that his alveolar $CO_2$ concentration will initially fall at a rate of $\Delta \dot{Q}/V_L$ moles liter$^{-1}$ minute$^{-1}$, corresponding to a simple lung $CO_2$ washout, and then later fall at the slower but steady rate of $\Delta \dot{Q}/(V_L + bV_B)$ moles liter$^{-1}$ minute$^{-1}$, corresponding to whole-body clearance. The straight lines representing the two sloping asymptotes intersect at $Bt = 1$, thus giving a means for evaluating B directly.

The foregoing theory can be illustrated with the following numerical values for the physiological parameters $V_L = 5$ liters
$V_B = 20$ liters
$R = 5$ liters/minute
$M = 10$ millimoles/minute
$\dot{Q} = 19$ millimoles/minute
$c_L^\circ = 2.5$ millimoles/liter
$\Delta \dot{Q} = 2.7$ millimoles minute
$b = 1.25$
$A = 0.25$ minute$^{-1}$
$B = 1.5$ minute$^{-1}$ When these values are substituted into the equation for alveolar $CO_2$ (6) concentration the result, with $t$ in minutes and $c_L$ in millimoles per liter, is $$c_L = 2.5 - 0.3(1 - e^{-1.5t}) - 0.09t \quad (9)$$

which is both qualitatively and quantitatively similar in shape to typical hyperventilation curves. The slope of the second asymptote in the predicted hyperventilation curve, when divided by the excess $CO_2$ loss rate, gives a measure of the $CO_2$ gas-storable space—which is well known to be closely related to the extracellular pH and total bircarbonate.

The biological $CO_2$ control loop for respiratory regulation is closed mathematically in the above equations by requiring the excess $CO_2$ blow off rate $(\dot{Q} - M)$ to be a function (linear to a first approximation) of the alveolar excess $CO_2$ concentration $(c_L - c_L^\circ)$.

*Sinusoidal $CO_2$ elimination rate*

It is evident from the differential equation governing the alveolar $CO_2$ concentration $c_L$ that the coupling between the alveolar and tissue compartments is controlled by the blood flow perfusing the pulmonary and peripheral circuits. Consequently, the role played by the cardiac output can be elicited by programming a sinusoidal oscillation in the $CO_2$ elimination rate, and observing the amplitude and phase lag of the resultant alveolar $CO_2$ concentration changes.

Thus, if the subject varies his $CO_2$ blowoff rate $\dot{Q}$ above and below his metabolic $CO_2$ production rate M in a sinusoidal fashion then $$\dot{Q} = M + Ae^{j\omega t} \quad (10)$$

where $A < M$ and $\omega$ is the angular frequency (radians per minute) of the variation. Correspondingly, the alveolar $CO_2$ concentration $c_L$ will vary sinusoidally about its normal means value $c_L^\circ$, but with a distinct amplitude and phase, i.e., $$c_L = c_L^\circ + kAe^{j(\omega t - \theta)} \quad (11)$$

where $\theta$ is the phase lag (in radians) and $kA$ is the amplitude of the variation. Substitution of these two equations into the whole-body time-constant formula, $$T = \frac{V_B}{R} = \frac{(M - \dot{Q}) - (V_L + bV_B)}{V_L \dot{c}_L + \dot{Q}} \dot{c}_L \quad (12)$$

gives $$T = \frac{[j\omega k(V_L + bV_B)e^{-j} - 1]}{\omega[k\omega V_L e - j0 + j]} \quad (13)$$

It is at once evident that in order to satisfy the requirement that T have a zero imaginary component the phase angle $\theta$ must satisfy the condition that:

$$\sin \theta = \frac{1 + \omega^2 k^2 V_L (V_L + bV_B)}{\omega k (2V_L + bV_B)} \quad (14)$$

Consequently, for sinusoidal variations in the $CO_2$ blow-off rate the time-constant formula reduces to $$T = \frac{\sqrt{k^2 \omega^2 (V_L + bV_B)^2 - 1}}{\omega \sqrt{1 - k^2 \omega^2 V_L^2}} \quad (15)$$

Since $\omega$ is known from the subject's breathing program, and $V_L$ and $(v_L + bv_B)$ are known from the results of the previously mentioned transient study, and the amplitude factor $k$ (minutes/liter) is obtainable from an accurate alveolar $CO_2$ tracing, the physiologically important ratio $T = V_B/R$ is a readily computable parameter.

In the drawing the subject (not shown) breathes into the face mask 10, inhaling through the inlet 10a and exhaling through the outlet 10b, the inlet and outlet being equipped with suitable check valves as indicated. The exhaled air is ultimately allowed to escape as at 14. Prior to escape, however, the flow meter 11 senses the actual flow of $CO_2$ and delivers voltage information $f(t)$ as at 15 and 16. The measuring equipment also detects the $CO_2$ concentration and delivers voltage information $c(t)$ along the lines 17 and 18'. The lines 15 and 17 are connected to a voltage multiplier 18 from which a signal is delivered along the line 19 which follows the equation:

$$v(t) = f(t) \cdot c(t) \quad (16)$$

This voltage information (along the line 19) is then sent through a time differentiating network generally designated 20 to develop voltage corresponding to $\dot{Q}$ as at 21 and voltage corresponding to M as at 22. For this purpose, the resistances 23 are rated at 100K ohms and those at 24 are rated at 2000K ohms. The condensers 25 and 26 are rated respectively at 100 and 5 microfarads while those at 27 and 28 are rated respectively at 2000 and 100 microfarads. The information on lines 21 and 22 is delivered to a difference amplifier as at 29 and this, along with a sine wave voltage from the generator 30 is conducted by a line 31 to the breathing air indicator 13. By virtue of introducing 1000K resistors as at 32, the equation for the voltage reaching the indicator 13 is $$0.01[(\dot{Q} - M) - A \sin \omega t] \quad (17)$$

The voltage information on flow rate and rate of change of concentration as delivered along lines 16 and 18 are delivered respectively to a trigger 32 and end-expiratory $CO_2$ concentration sampler 33. Resulting from these two units is a voltage corresponding to the alveolar $CO_2$ concentration at 34. This voltage is sent to a peak-follower circuit 35 then to an amplitude detector 36. The output of the detector 36 as at 37 is a voltage corresponding to $kA$. This is then delivered to the computer 12 which is programmed according to Equation 15 and wherein the circuit variables $k$, $\omega$, $bV_L V_B$ are provided as determined hereinbefore. The output of the computer 12 is delivered to a time constant display indicator 38 which visually depicts the time constant for total body profusion in minutes.

While in the foregoing specification a detailed description of an embodiment of the invention has been set down for the purpose of explanation, many variations of the details herein given may be made by those skilled in the art without departing from the spirit and scope of the invention.

I claim:

1. Apparatus for determining whole body perfusion rates comprising a mask for collecting a subject's expired gas, means coupled to said mask for measuring the $CO_2$ concentration and flow rate, an indicator coupled to said measuring means and positioned for viewing by a subject breathing into said mask, said indicator being operative to present $CO_2$ blowoff rate information in a manner causing the subject to vary his $CO_2$ elimination rate in a cyclic fashion, and means including a computer coupled to said measuring means for computing the perfusion time constant when the subject's $CO_2$ blowoff rate is sinusoidally varied about the mean $CO_2$ production rate.

2. In a method for ascertaining the whole body perfusion time constant of a subject, the steps of collecting the subject's expired gas, measuring the $CO_2$ concentration and flow rate, and varying the subject's $CO_2$ blowoff rate sinusoidally about his mean $CO_2$ production rate.

3. In a method for ascertaining the whole body perfusion time constant of a subject, the steps of collecting the subject's expired gas, measuring the $CO_2$ concentration and flow rate, varying the subject's $CO_2$ blowoff rate sinusoidally about his mean $CO_2$ production rate, and delivering the $CO_2$ concentration and flow rate information to a computer for determining the perfusion time constant.

4. In a method for ascertaining the whole body perfusion time constant of a subject, the steps of collecting the subject's expired gas, measuring the $CO_2$ concentration and flow rate, varying the subject's $CO_2$ blowoff rate sinusoidally about his mean $CO_2$ production rate, and delivering the $CO_2$ concentration and flow rate information to a computer programmed according to the equation:

$$T = \frac{\sqrt{k^2 \omega^2 (V_L + bV_B)^2 - 1}}{\omega \sqrt{1 - k^2 \omega^2 V_L^2}}$$

References Cited
UNITED STATES PATENTS

| | | | |
|---|---|---|---|
| 2,630,798 | 3/1953 | White et al. | 128—2.07 |
| 2,687,128 | 8/1954 | Fleisch | 128—2.07 |
| 3,282,803 | 11/1966 | Poepel et al. | 204—1 |

RICHARD A. GAUDET, *Primary Examiner.*

S. BRODER, *Assistant Examiner.*